United States Patent [19]
Baptiste

[11] Patent Number: 5,437,103
[45] Date of Patent: Aug. 1, 1995

[54] RADIAL GUIDE DEVICE FOR A SAW APPARATUS

[76] Inventor: Guy Baptiste, 425 Forkedneck Rd., Indian Mills, N.J. 08088

[21] Appl. No.: 306,388

[22] Filed: Sep. 14, 1994

[51] Int. Cl.$^6$ ............................................. B27B 9/04
[52] U.S. Cl. ................................... 30/372; 30/310; 30/371; 83/745
[58] Field of Search ............... 30/300, 310, 371, 372, 30/289, 290; 83/745

[56] References Cited

U.S. PATENT DOCUMENTS

| | | | |
|---|---|---|---|
| 4,602,434 | 7/1986 | Stradling | 30/372 |
| 5,016,354 | 5/1991 | Baine | 30/371 |
| 5,261,150 | 11/1993 | Grubb | 83/745 X |

FOREIGN PATENT DOCUMENTS 120852  11/1918  United Kingdom ................. 30/310

Primary Examiner—Douglas D. Watts
Attorney, Agent, or Firm—John Lezdey

[57] ABSTRACT

A radial guide device for a power saw apparatus to accommodate the radius of the circular pattern to be cut from a hard relatively smooth surfaced planar material. The present invention also contemplates a slidably movable pivot means to adjust a selectively adjustable radius on a fixed guide arm to provide the desired circular pattern in a selected planar material. More particularly, the invention relates to a guide device which allows for a portable electric circular saw to be mounted therein and as an insert to be guided at a desirable fixed radial direction as it transverses the material to be cut.

15 Claims, 2 Drawing Sheets

RADIAL GUIDE DEVICE FOR A SAW APPARATUS

FIELD OF THE INVENTION

This invention relates to a radial guide device for a power saw apparatus which is useful in cutting circular patterns in hard substances and is particularly adapted for cutting masonry materials.

DESCRIPTION OF THE PRIOR ART

Some known methods for manufacturing circular work pieces such as table tops which are to be cut from planar material involve scribing a circle on the surface and then cutting along the scribed pattern. Guides for circular cutting are also well known in the art.

U.S. Pat. No. 4,602,434 to Strelling discloses a guide device using an adjustable arm, that can be a bar or cable, which at its outside end is connected to a conventional circular electric saw. And adjacent the other end is a pivot which is designed to be firmly attached to a working surface to provide the radius of the circular figure to be cut from the planar material.

U.S. Pat. No. 5,016,354 to Baine relates to a circular cutting device comprising a conventional hand-held circular saw attached at one end to an adjustment bar having a longitudinal slot therein and an extension bar having an axis extending generally parallel to the axis of an adjustment bar. The extension bar which is slidably movable with respect to the adjustment bar and releasably secured thereto. The extension bar is secured to the workpiece.

In known methods and in each of the above patents the firm attachment to the workpiece requires a sharp instrument such as a pin or nail from which the devices are pivoted. The hardness of masonry materials such as marble, concrete, tile, glass, brick, stone and metals preclude the use of pins or nails. Furthermore, the aforementioned prior art does not contemplate the use of their devices on masonry material.

Generally, conventional masonry saws include a work supporting table mounted for horizontal movement on a frame in combination with a power driven rotary saw blade which is pivotly mounted above the table to provide a substantially straight line cut. To effect a circular pattern using conventional saws, a series of straight line cuts are required with the workpiece rotated after each cut. Then it is necessary to round off the cuts using sanders or other abrasive devices to yield an edge having satisfactory smooth characteristics. These methods are very labor intensive and thus add expense to the manufacturing cost.

Therefore, there exists a need for a simple and economical device to facilitate cutting a circular design from planar materials, especially from hard substances such as masonry materials and metals.

SUMMARY OF THE INVENTION

The present invention provides a new, useful and economical means for producing planar materials which are cut to produce an article having a circumferential edge. In accordance with the present invention a radial guide device for a power saw is provided to produce generally circular cut in a selected planar material having a relatively smooth surface comprising:

a support member having a base plate and an upwardly extending plate, the an upwardly extending plate being normal to said base plate;

said base plate having supporting means and releasably securing means for a power saw;

said upwardly extending plate adjacent the upper end and on the opposite side of the base plate has a receptacle means for receiving and securing a guide arm in a horizontal position parallel with the base plate;

a guide arm; and a pivot means comprising a conduit means for securing said guide arm, a swivel and a vacuum gripping means to provide a pivot for the guide arm and a fixed radius for the device.

The principal object of this invention is the provision of a guide device for a portable power saw comprising in combination a support member for the power saw, elongated guide registrable with the support member and a movable and adjustable pivot means.

A further object of this invention is the provision of a guide device for a portable electric saw of simple and economic construction which may be easily attached to the saw and which can easily dismantled, stored, transported and reassembled at the job site.

A still further object of this invention is the provision of a pivot means comprising a conduit for the guide arm, a swivel and a vacuum gripping means.

Yet another object of this invention is the provision of a guide device for a portable electric saw that may be used with an electric saw having a circular blade or a reciprocating blade.

Other objects and advantages of this invention with become apparent from the following description taken in connection with the accompanying drawings wherein is set forth by way of illustration and example of an embodiment of this invention.

BRIEF DESCRIPTION OF THE PREFERRED EMBODIMENTS

Figure 1:
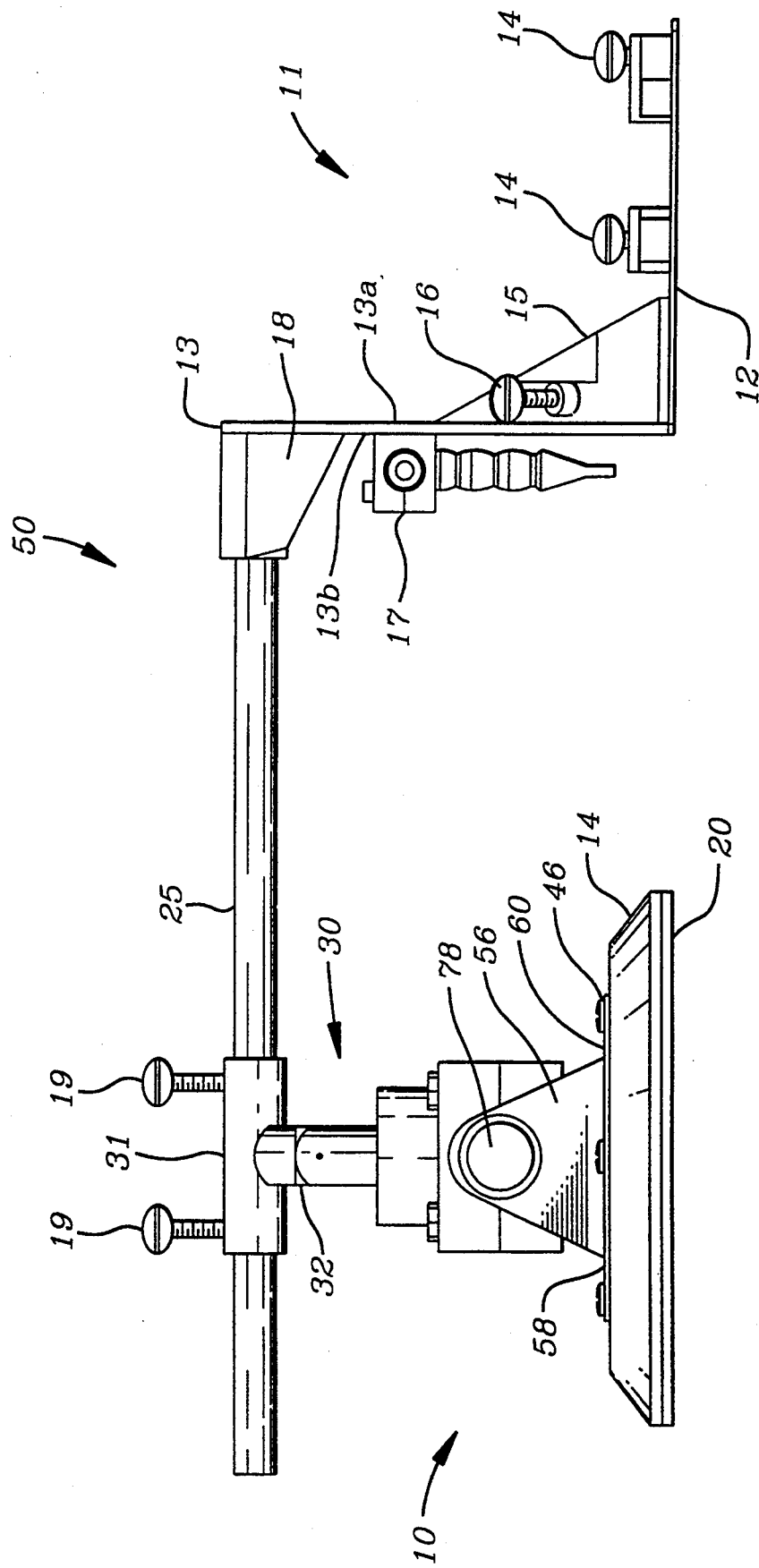
FIG. 1 is an elevational view of the radial guide device of the present invention in a preferred embodiment.
Figure 2:
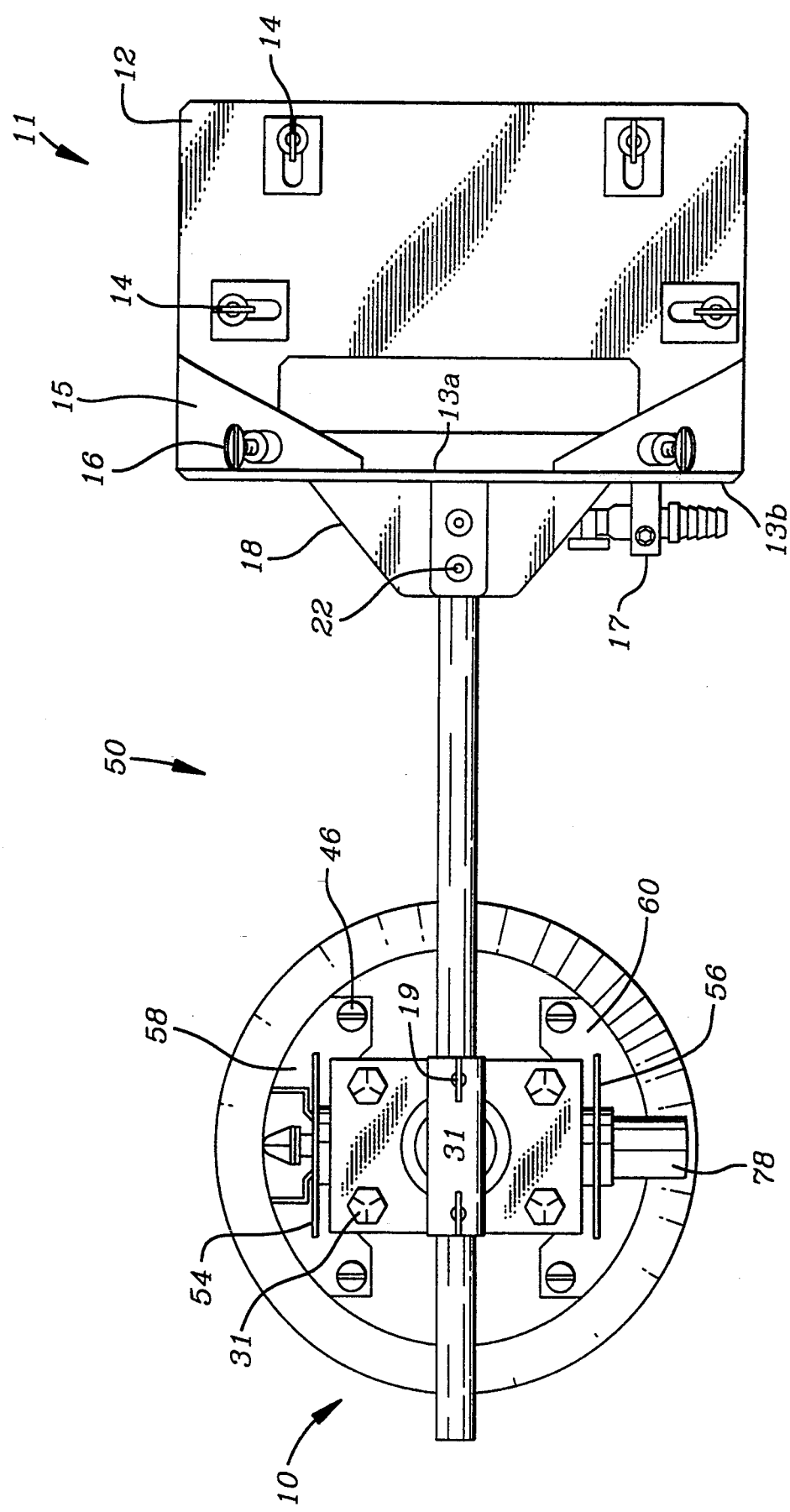
FIG. 2 is a top plane view of the radial guide device of the present invention.

Referring to FIGS. 1 and 2, there is illustrated a radial guide device 50 within the scope of the present invention. A support member 11 comprising a base plate 12 and upwardly extending plate 13 is designed to accommodate a portable power saw which is positioned in a base plate 12 and secured by clamps 14 and by positioning bolts 16 located in flanges 15. The flanges 15 are positioned on each side of the support member 11 and are located adjacent the right angles formed by the base plate 12 and the plate 13. While FIG. 1 shows support member 11 as being constructed from two metal plates, this component may be integrated and formed from one piece of metal.

A portable electric saw having either circular or reciprocating saw blades, of simple and economic construction and which may be easily attached to the radial guide device of the present invention may be used. Saws having varied power sources may also be employed. For example, saws driven by internal combustion engines or by fluids such as hydraulics or air are within the scope of this invention. Preferably the saw can be adjusted to produce a selected edge on the workpiece, i.e., straight, bevelled, concave, convex, etc.

A wide variety of hard of relatively smooth surface planar materials may be cut using the radial guide device of the present invention in combination with a power saw equipped with the appropriate blade. Broadly, any metallic or non-metallic materials may be cut limited only by the capacity of the power saw equipped with the appropriate saw blade. For example, suitable materials may range from plywood to hard alloy steel. More particularly, the device of this invention in combination with a circular saw is adapted for cutting hard non-metallic materials such as masonry materials. Suitable masonry materials include marble, concrete, tile, glass, brick, stone, etc.

As shown in FIGS. 1 and 2, on side (b) opposite the power saw side 3(a) of the upwardly extending plate 13, fluid nozzle 17 may be attached to direct fluid coolant to the saw blade (not shown). Fluid nozzles manufactured by Lockline Corp., Indian Mills, N.J.

Also on side 13(b) and located above nozzle 17 are receptacle means 18 which are attached adjacent the top edge. Receptacle means 18 comprises a housing to accommodate guide arm 25 and securing means for the same. The one end of guide arm 25 is housed in receptacle means and may be permanently secured by rivets 22 as shown in FIG. 2 mechanical fasteners (bolts and nuts) or by welding. Preferably the guide arm 25 is releasably secured by threaded bolts or other mechanical fasteners extending through receptacle 18 means to engage guide arm 25 so that various guide arm lengths can be interchanged to provide the desired cutting radius.

The guide arm 25 can be of any shape, e.g., a flat bar or preferably a round or square rod. The guide arm 25 extends radially and horizontally from the receptacle means 18 and passes through conduit means 31 which is a component of and connected to pivot assembly 30 which includes swivel 32 and vacuum gripping means 10. This guide arm 25 is horizontally parallel but in a different plane from the base plate 11. This pivot assembly 30 is slidably movable along guide arm 25 and releasably secured by threaded bolts 19. These threaded bolts may carry a screw head or a nut head but preferably are designed so that they may be tightened or released without the need for tools.

Once the length of the radius is determined, bolts 19 are used to lock the pivot assembly 30 and the vacuum gripping means 10 is then centered and forced against the smooth surface of the workpiece. Then the vacuum is applied to firmly retain the gripping means 10 in a fixed position whereupon the guide arm 25 may be turned on pivot assembly 30 to form a working radius. Operation of the saw blade in commenced and the saw is advanced in a pivotal movement through the material to be cut.

The radial guide device 50 of the present invention provides a new, useful and inexpensive means for cutting circular workpieces from planar materials where the cut edges of the workpiece are satisfactory without further abrasive treatment.

Vacuum gripping means 10 comprises a device such as disclosed in U.S. Pat. No. 3,240,525 to Wood, which disclosure is incorporated by reference. The device includes a gripping pad 14, a vacuum pump (not shown) and a valve structure (not shown). The pad 14 is generally a circular body of resilient material such as rubber or the like. The gripping surface of the pad 20 includes a plurality of radially spaced concentric grooves which are relatively shallow and extend from the innermost groove and communicate with the outermost groove, thus forming a network of intercommunicated grooves in the face with grooves being of such minute section as to allow the vacuum pump to evacuate the space between the attaching face and the surface of the workpiece to a high degree of vacuum.

The pump assembly includes a pair of bracket plates 54 and 56 each of which is provided with an arcuate attaching base 58 and 60. The base 60 is provided with screws 46 for attaching the bracket plates 54 and 56, the outer end of bracket 54 is rigidly affixed to and forms a closure for one end of a pump, the other end of the pump cylinder 64 (not shown) is rigidly affixed to the bracket 56 with bracket 56 having an opening therein conforming with and forming a continuation of pump 64. Upon reciprocation of plunger 78 a piston will reciprocate thus forming a pump for evacuating and forming a vacuum between the relatively smooth surface and the resilient pad 20.

The preferred material of construction for the device is aluminum because of its strength and light weight. However, any conventional metal can be used for this manufacture.

What is claimed is:

1. A radial guide device for a power saw to provide a generally circular cut in a selected planar material having a relatively smooth surface comprising:

a support member having a base plate and an upwardly extending plate normal to and from one side of said base plate;

said base plate having supporting means and a releasably securing means for a power saw;

said upwardly extending plate adjacent the upper end and on the opposite side of the base plate having a receptacle means for receiving and securing a guide arm in a horizontal position parallel with the base plate;

a guide arm; and a pivot means comprising a conduit means for adjusting and securing said guide arm, a swivel and a vacuum gripping means to provide a pivot movement for the guide arm and to provide a fixed radius for the device.

2. The radial guide device of claim 1 wherein said upwardly extending plate includes at least one fluid nozzle.

3. The radial guide device of claim 1 wherein said base plate and said upwardly extending plate are formed from one piece of metal.

4. The radial guide device of claim 1 wherein said guide arm is releasably secured in receptacle means.

5. The radial guide device of claim 4 wherein the guide arm varies in length.

6. The radial guide device of claim 1 wherein pivot means is slidably adjustable on said guide arm and secured thereon to provide a fixed radius.

7. The radial guide device of claim 1 in combination with a power saw.

8. The combination of claim 7 wherein the power source is selected from an electric motor, an internal combustion engine, hydraulic motor or air motor.

9. The combination of claim 8 wherein the electric motor is either circular or reciprocating.

10. The combination of claim 7 wherein said selected material is metallic or non-metallic.

11. The combination of claim 9 wherein said non-metallic material is masonry material.

12. The combination of claim 9 wherein said masonry material is selected from marble, concrete, tile, brick or stone.

13. The combination of claim 12 wherein said masonry material is marble.

14. A radial guide device in combination with a portable electric circular saw to provide a generally circular cut in a selected planar material having a relatively smooth surface comprising:

- a support member having a base plate and an upwardly extending plate normal to and from one side of said base plate;
- said base plate having a supporting means and a releasably securing means for said electric circular saw;
- said upwardly extending plate adjacent the upper end and on the opposite side of the base plate having a receptacle means for receiving and securing a guide arm in a horizontal position parallel with the base plate;
- and having at least one fluid nozzle;
- a guide arm; and
- a pivot means comprising a conduit means for adjusting and securing said guide arm, a swivel and a vacuum gripping means to provide a pivot movement for the guide arm and to provide a fixed radius for the device.

15. The combination of claim 14 wherein said planar material is marble.

* * * * *